Figure 1:
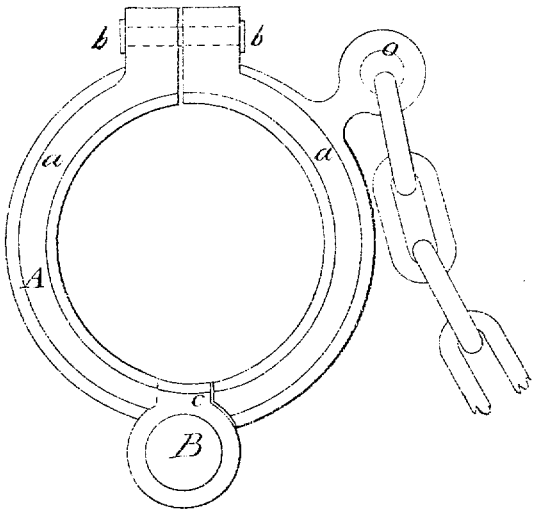

JOHN H. LYON.

Improvement in Seal Locks for Railway Cars.

No. 4,734. Reissued Feb. 6, 1872.

*Witnesses.*

Wm. P. Lett

Alfred Shedlock.

John H. Lyon

*Inventor.*

AM. PHOTO-LITHOGRAPHIC CO. N.Y. (OSBORNE'S PROCESS.)

UNITED STATES PATENT OFFICE.

JOHN H. LYON, OF NEW YORK, N. Y.

IMPROVEMENT IN SEAL-LOCKS FOR RAILWAY CARS.

Specification forming part of Letters Patent No. 29,181, dated July 17, 1860; reissue No. 4,734, dated February 6, 1872.

SPECIFICATION.

*To all whom it may concern:*

Be it known that I, JOHN H. LYON, of the city and county of New York, and State of New York, have invented certain new and useful Improvements in Metallic Seal-Fastenings; and I do hereby declare that the following is a full and correct description thereof, reference being had to the accompanying drawing and to the letters of reference thereon.

The object of my invention is to provide a simple metallic seal-fastening capable of being attached to the side of a railroad car by a chain, to be used to secure the door by the ordinary hasp and staple, so as to prevent the opening of the door without breaking the seal, which, however, when broken to open the door, may be readily removed and resealed with a new rivet-seal, as hereinafter described. Before my present invention tags or loops of thin metal had their ends secured by compressing a mass of soft metal upon and around them, but, in such cases, it was easier to cut the loop or tag than to break the seal, and, therefore, such loops or tags were only used a single time and replaced by a new one for the next sealing. Moreover, the ends of said loops or tags were so shaped that when embedded in the soft-metal seal they could not be removed readily if the seals were broken. Before my invention padlocks have been sealed with soft-metal seals; and in one case, described in an English provisional patent to Jean Salles, of Paris, No. 1,532, 1857, the bolt of a padlock is described as being secured to the lock-case by a soft-metal wire riveted through the projecting end of the bolt and the lock-case. But the sealed padlock is an expensive device and involves the use of a padlock when a simple fastening would be equally efficient as a sealing fastening. A looped or tag-fastening is described in a patent of the United States to Mears and Houlton, dated July 14, 1857; but in this device the ends of the loop or tug are secured by disks of metal at their ends, one of the disks having a riveting piece of soft metal secured to it by soldering, which riveting piece was riveted after being passed through a hole in the other disk. In this case, after the seal was broken, there is no provision for renewing it except to unsolder the broken riveting piece and replace it with a new one by soldering it to the disk; and, therefore, it was cheaper to cut the loop and put in a new tag.

My invention consists, first, in a simple metallic seal-fastening suitable for securing the doors of railroad cars through the ordinary hasp and staple; said fastening consisting of simple metallic shackle or loop of hard metal secured at the ends, to prevent opening, by an independent soft-metal rivet-seal, which forms no part of the shackle until applied thereto for the purpose of sealing the same; the combination being such that when broken the rivet-seal may be readily removed from the shackle and the shackle resealed by the use of another soft-metal rivet. And my invention further consists in countersinking or beveling the hole or holes in the hard-metal shackle, in which the rivet of soft metal is introduced to seal the shackle in order that a further security may be obtained, as hereinafter described. My invention also consists in beveling the ends of the shackle, so that a cutting instrument may be readily introduced between them to sever the rivet of soft metal when the rivet hole or holes are beveled or countersunk.

The accompanying drawing represents a seal shackle fastening or fastenings which embodies my improvements.

Figure 2:
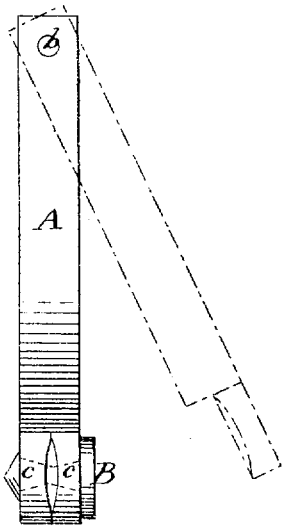
Figure 4:
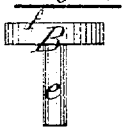
Figure 3:
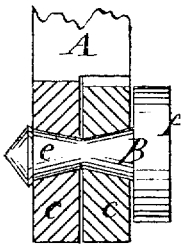

Figure 1 is a plan view of a sealed shackle. Fig. 2 is an edge view of the same. Fig. 3 is a detached section, showing the countersunk or beveled seal-holes. Fig. 4 is a view of an independent soft-metal rivet-seal.

Letter A represents a shackle formed of two parts, *a a*, hinged at *b*, and provided with ears *c c* at the ends, which close together and are sealed by a soft-metal rivet, B, made of lead or other soft metal suitable for a seal-rivet, which soft-metal rivet is introduced through the ears, holes being made in them for that purpose, and the soft-metal rivet sealed by compressing the ends of the rivet. The shape of the shackle and rivet holes is not material to the first part of my invention as it is obvious that any form of shackle and rivet hole which will enable a rivet to be introduced and sealed and readily removed when broken, to admit of resealing the shackle by simply using a new rivet, will embody said invention. But, in order to give greater security to my improved seal-lock, I have beveled the holes in the ears of the shackle, as shown in Fig. 3, so that if the heads of the rivet, after being riveted, should be broken off the rivet would still hold and could not easily be driven through the ears of the shackle. In case the holes are beveled, as shown in Fig. 3, the edges of the ends *c c* of the shackle should be chamfered, so as to leave an aperture of approach, as shown at Fig. 2, for the introduction of a wedge or sharp cutting instrument to sever the soft-metal rivet-seal between the ends of the shackle. The shackle A is fastened to a car or other article or door to be locked by a chain attached to an ear, *o*, formed on the shackle. The shackle A may be formed of one piece of hard metal sufficiently elastic to permit the ends to be opened to receive the staple of the door to be locked.

I do not restrict the first part of my invention and the first claim hereto appended to a soft metal rivet passed through both ends of the shackle, nor to the particular construction of the ends of the shackles herein described.

I claim—

1. A metallic seal-fastening, consisting of a simple shackle of hard metal, constructed substantially as described, secured at the ends to prevent opening by an independent soft-metal rivet-seal, which forms no part of the shackle until applied thereto for the purpose of securing the shackle; the construction being such that the rivet may be readily removed when broken to open the shackle, and the shackle resealed simply by use of a new seal-rivet, substantially as described.

2. In combination with the shackle and rivet the conical or beveled rivet holes, substantially as described.

3. The beveled ends of the shackle in combination, so as to form an aperture of approach to the rivet between the ends of the shackle, substantially as described.

JOHN H. LYON.

Witnesses:
WM. F. LETT,
JOSEPH CAMPBELL.